June 12, 1951      K. F. SPALDING      2,556,452
APPARATUS FOR SEALING PLASTICS
Filed Jan. 27, 1950
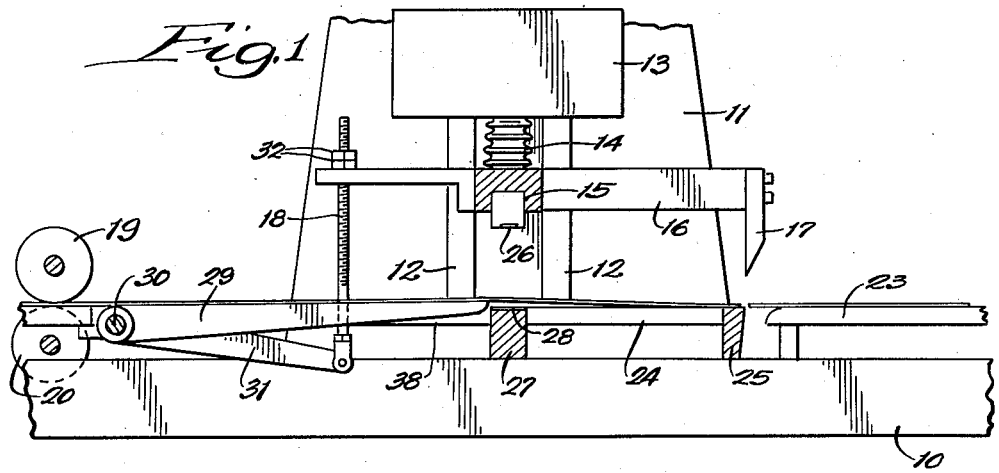
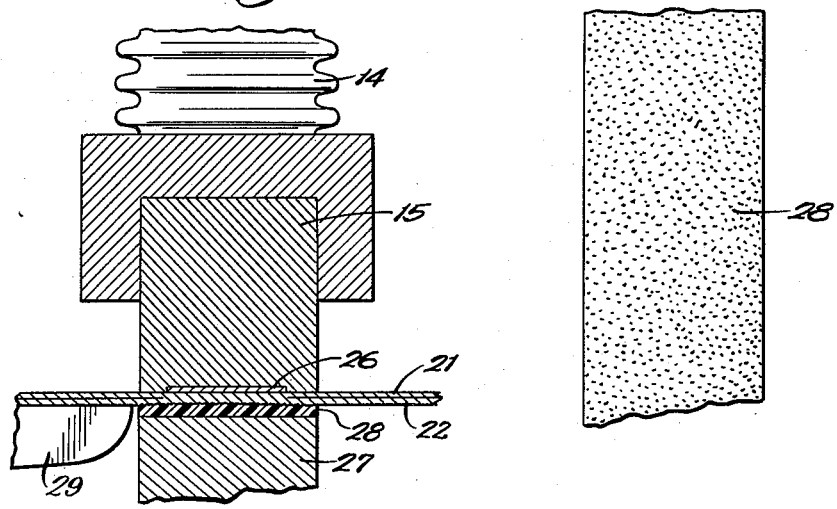
INVENTOR:
Kenneth F. Spalding,
BY Dawson, Orms, Bortland, Fangenberg,
ATTORNEYS.

Patented June 12, 1951

2,556,452

UNITED STATES PATENT OFFICE 2,556,452

APPARATUS FOR SEALING PLASTICS

Kenneth F. Spalding, Chicago, Ill., assignor to William F. Stahl, Kenilworth, Ill.

Application January 27, 1950, Serial No. 140,910

2 Claims. (Cl. 154—42)

This application relates to apparatus for sealing together plastic sheets; in particular, it concerns an apparatus which gives greatly improved results in the sealing of thin sheets and, in particular, eliminates entirely wrinkling and buckling of seals in such material.

Creation of clean, strong seals in thin plastic sheets by application of heat thereto has in the past been beset by great difficulties. As the art has developed, the problems have gradually been solved, but no prior-art apparatus to my knowledge has ever provided a means in which, with simple equipment, a seal between a pair of very thin plastic sheets can be prevented from wrinkling and buckling.

The phenomenon to which I refer occurs during the interval after heat has been applied to the adjoined sheets in sufficient quantity to raise their temperature above the fusion point. When thus heated, the two sheets fuse together and form a unitary sheet; in cooling, however, the molecular re-arrangement resulting from the heat and the fusion, coupled with other causative factors, create uneven stresses within the material and cause it to curl, wrinkle, and bend while cooling.

This phenomenon in virtually all cases produces an unsightly seal; in some cases, moreover, the wrinkling action of the plastic gives rise to air pockets and other flaws in the seal. The phenomenon under consideration, therefore, affects adversely both the appearance and the quality of the seal produced.

Various efforts have been made to solve the problem. The most successful one, in all probability, is the procedure in which the plastic sheets are confined between and subjected to pressure from sealing bars during the cooling process. That is, in some systems, the plastic sheets are pressed together, heat is applied (usually by electric current), and the heat is removed (current shut off) while the bars remain pressed together. After sufficient time has elapsed for the plastic to have cooled and set fully, the bars are separated and the plastic sheets reoriented in preparation for the next sealing operation.

The technique just described is quite effective in preventing wrinkles from forming in the seal, but it has the disadvantage of being very slow. The plastic sheets must cool while still in contact with the relatively large sealing bars. While being thus pressed between the bars, the seal has very little air contact and thus no facilities for rapid heat transfer to the atmosphere. Moreover, the ambient temperature of the sealing bars is invariably well above room temperature, with the result that cooling is further slowed down.

The result of this slowness of operation is that sealing apparatus in which the seal is cooled while still under pressure from the sealing bars is capable of only limited production speed, since several seconds must be allotted between sealing operations for cooling.

In the present invention, I have employed simple apparatus and have nonetheless achieved a means of eliminating completely unwanted wrinkling and buckling in the seals produced.

Plainly, suppression of such wrinkling and buckling by the hot plastic during the cooling operation calls for some means of holding securely the hot plastic under longitudinal and lateral tension during the cooling interval. The prior art achieved this result by "brute force"— that is, by maintaining the sealing bars in position on the plastic, pressing thereon, during the interval of cooling. In my apparatus, however, I have discovered and now disclose a means of holding securely the plastic in place by exerting thereon a very large—almost innumerable— number of small pulls distributed substantially evenly over the face of the plastic. Each of these "pulls" is, individually, quite weak, but collectively they are more than strong enough to hold the plastic against movement during sealing. That is, they are amply strong enough to overcome the inter-molecular forces which tend to produce curling and wrinkling.

I achieve this new result by the use of a sealing bar having a slightly yielding, rough-textured surface containing a myriad of minute recesses into which the plastic flows while it is in molten state. The material used for surfacing my sealing bar possesses a sufficiently high melting point as to be unaffected by the temperature which creates the seal in the plastic sheets. As a result, when the heated sealing bar is removed, the sealing bar having the rough-textured surface securely grips the plastic in which the seal has been formed and forces it to cool and harden in precisely the physical conformation of the bar surface itself.

With the novel sealing bar just described, I have provided means, which may be manually operated or coordinated with the sealing bar actuating mechanism, for stripping the plastic from the sealing bar after it has cooled, thus permitting the sheets to be moved on and preparing the apparatus for another sealing operation.

The practical result of my invention is a novel sealing apparatus in which the heated sealing bar is removed from the plastic immediately after it has delivered the necessary heat, and in which, therefore, the seal cools in full contact with the air—if desired, even in contact with a controlled stream of air for most rapid cooling. Notwithstanding this rapid cooling, the plastic forms perfect lineal seals without any trace of buckling, shrinking, wrinkling, or other malformation.

The production rate achievable with my apparatus is several times that of prior-art devices, since only a fraction of a second is required for cooling time.

An object of the present invention, therefore, is the provision of simple sealing apparatus capable of effecting lineal seals in thin plastic sheets without wrinkling, buckling, or shrinking.

Another object of my invention is to provide a sealing apparatus which will seal plastic sheets without malformation while exposing the seals to the cooling atmosphere during the cooling interval, thus greatly speeding up the cooling process.

Still another object of my invention is to provide, by means of a sealing bar having a slightly yielding, rough-textured surface, a means of tightly securing a plastic seal against movement in either longitudinal or lateral direction, and against undesired material flow, during the critical period in which it is cooling after being heated to fusion temperature.

Still another object of my invention is to combine, in simple sealing apparatus, a rough-textured sealing bar, capable of inhibiting shrinking and other physical malformation during cooling, with simple and effective means, operative following each sealing operation, for stripping the seal from the sealing bar surface to which it tightly adheres during cooling.

Other objects and advantages of my invention will become apparent as the specification proceeds.

I have, in the accompanying drawing, illustrated a particular embodiment of my invention for purposes of illustration. In the drawing, Figure 1 is a view in side elevation, partly in section, of a sealing apparatus embodying my invention as herein disclosed and claimed; Fig. 2 is a greatly enlarged fragmentary sectional view of a portion of the apparatus of Fig. 1, showing the relative positions of the various parts at the time the sealing bars are pressing against one another to subject the plastic sheets to high temperature and pressure for seal formation; and Fig. 3 is a plan view of the rough-textured surface of the sealing bar which makes possible, in my invention, the rapid production of wrinkle-free seals in thin sheets.

In the drawing I have indicated a base or table 10, surmounted by a vertical standard 11 affixed thereto. Suitably mounted on standard 11 for reciprocation in the vertical plane, as by channel irons 12, is a carriage 13 which carries, on a pair of insulators 14, a sealing bar 15.

Supported on transverse bar 15 is an elongated member 16 extending longitudinally of table 10 and carrying at its forward end a cutting blade 17, oriented with its sharp edge downward. The other end of transverse member 16 is bored to receive loosely a bolt 18 which, in a manner to be more fully described later, achieves mechanical coordination between the sealing and stripping operations.

Mounted above the surface of table or bench 10 are facilities for carrying forward a pair of adjoined plastic sheets, denoted respectively 21 and 22. Rollers 19 and 20, which may be turned by any suitable mechanical apparatus, serve to urge forward sheets 21 and 22 between sealing operations so as to place the sheets in position for formation of a new seal. A guide surface 23, seated downstream of the sealing apparatus, receives the plastic sheets (which may be envelopes) after the seals have been made and the individual sealed envelopes have been severed from the main body of plastic by knife 17. Surface 23 may, if desired, be a portion of a conveyor system.

Since the means of feeding the plastic sheets to the sealing machine, comprising rollers 19 and 20, and the means for carrying away the completed material after sealing, including member 23, are not a portion of my invention and are old per se, I shall not describe their operation more fully. Such structures are well known to persons skilled in the art of plastic sealing.

Likewise, in the illustrated embodiment, I provide, immediately downstream of the sealing position, a platform 24, mounted on bench 10, provided at its downstream end with a cutting plate 25 which co-operates with knife blade 17 in severing the completed envelopes from the main body of plastic after the successive sealing operations. The use of apparatus similar to knife 17, either alone or coordinated with the action of the sealing bar, is not broadly novel and is not claimed herein as any part of my invention. Accordingly, I shall not describe the operation of elements 17 and 25 any more fully. The directly operative portion of sealing bar 15 is a strip 26 of Nichrome or other electrical resistance material, mounted in the under surface of sealing bar 15 and proportioned in length and breadth according to the size of the seals which are to be formed in the plastic sheets.

Mounted on the top of bench 10 directly under sealing bar 15 is co-operating lower sealing bar 27, formed for the most part of a suitable rigid, solid substance, which may be metal or wood. Securely affixed to the upper surface of sealing bar 27 is a thin flat layer 28 of relatively soft, high-temperature plastic such a neoprene rubber. The precise thickness of layer 28 is not critical; it should be thick enough to provide a good zone of heat insulation between the main portion of bar 27 and plastic sheets 21 and 22, particularly if bar 27 is formed of metal or good heat conductor. The critical characteristic of layer 28 is that its upper surface is rough-textured, as indicated in Fig. 3, and thus provided with a myriad of small recesses.

I have provided, to carry the plastic sheets between rolls 19 and 20 and the sealing position proper, a table or stationary conveyor 38, mounted above bench 10 at the same height as members 24 and 23. Pivoted to the side of member 38 is a lever cluster comprising an elongated stripping bar 29 and a shorter crank lever 31. Stripping bar 29 is preferably bifurcated so as to provide a forward portion extending entirely across and under sheets 21 and 22 immediately adjacent the upstream side of sealing bar 27, the two side arms of stripping bar 29 extending backward to the pivot 30 which supports the stripping bar and crank lever 31. Crank lever 31 is mechanically keyed to stripping bar 29 so that the two elements rotate together on pivot 30.

Pivoted to the forward end of crank lever 31 is the lower end of bolt 18, already mentioned as passing loosely through an aperture in the end of bar 16. Lock nuts 32, screwed onto bolt 18 above bar 16, serve as an adjustable stop member to control the point in the upward movement of sealing bar 15 at which bar 16 engages nuts 32 and raises bolt 18, taking with it crank 31 and stripping bar 29.

Any suitable stop means may be employed to place the lowermost limit of movement of stripping bar 29 at a point flush with or slightly below the level of the upper surface 28 of sealing bar 27. If the transverse portion of stripping bar 29 be made quite thin, it will rest on the top of member 38 at the desired height and thus make a separate stop means unnecessary.

Any suitable means (not shown) may be employed for supplying at the desired times an electric current to resistance strip 26, to provide heat for sealing, and to raise and lower at desired times the reciprocable structure carrying heated sealing bar 15 and transverse bar 16. Such structures are well known and need not be defined specifically herein, since my invention does not reside therein per se.

*Operation*

In the operation of my invention, the plastic sheets 21 and 22, usually taken from roll stock, are drawn between rollers 19 and 20, along the upper surface of member 38, over sealing bar 27, member 24, and onto member 23. As has been previously mentioned, suitable means (not shown) are provided for rotating rollers 19 and 20 at desired times to advance the sheets 21 and 22.

Sealing may be commenced by lowering sealing bar 15 into a tight pressure relation with sealing bar 27, the plastic sheets 21 and 22 being pressed therebetween. Upon contact with the plastic sheets, or prior thereto if desired, current is passed through heating element 26 and its temperature thereby raised to the fusion point of the plastics. As a result, after bar 15 has pressed on the plastic sheets 21 and 22 for a brief interval— usually a fraction of a second—the temperature of the plastic below heating element 26 is in the fusion zone and the formation of an integral bond between the two sheets takes place. At the same time, the melted plastic of sheet 22 flows into the myriad of tiny recesses and pockets on the upper surface of plastic layer 28.

Immediately after the seal has been formed, sealing bar 15 is raised and the heated plastic is exposed to the atmosphere. As previously mentioned, a controlled flow of cool air over the sealing surface may be provided if desired. In any case, the plastic cools with great rapidity after the removal of sealing bar 15, so that in a small fraction of a second the molten material has again set. Because its lower surface has been held in an iron grip by plastic layer 28, this cooling operation occurs without the slightest trace of buckling, wrinkling, or shrinking.

As the sealing bar 15 returns to its normal position, transverse bar 16 engages lock nuts 32 and causes stripping bar 29 to rise above the level of layer 28. This action pulls or "peels" the plastic sheets 21 and 22 away from the surface of layer 28 to which the sealed portion has been adhering. After the stripping operation has thus occurred, rollers 19 and 20 may again be actuated to advance the plastic sheets into position for the next sealing operation.

In the illustrated embodiment, I have assumed that the plastic sheets were being formed into envelopes and that the orientation of knife blade 17 has been so chosen as to form a transverse cut through the middle of such seal during the time that the just-formed seal occupies a position under the knife blade during the formation of a new seal. It will be understood, of course, that that illustration is exemplary only, and that any desired means can be provided for processing or disposing of the sealed plastic after it has passed the sealing zone.

While I have in the present specification described in detail an illustrative embodiment of my invention, many variations thereof and changes in detail may be made by persons skilled in the art without departing from the spirit and essence of my invention. Accordingly, it is my desire that the scope of my invention be measured primarily with reference to the appended claims.

I claim:

1. In a plastic-sealing machine comprising a sealing bar, means for heating the same, and conveyor means for moving adjoined plastic sheets to a position adjacent the sealing bar for sealing, a second sealing bar adapted to cooperate with said heated sealing bar in applying a pressure to the plastic sheets during sealing, said second sealing bar having in contact with the plastic sheets a surface formed of high-temperature resistant material and having a rough texture providing minute recesses operative to receive and grip during and following the sealing operation the plastic being sealed, means for imparting to the sealing bars relative motion between sealing operations, a stripping bar mounted adjacent the second sealing bar and across the path of movement of the plastic sheets, and means for moving said stripping bar following each sealing operation to disengage the sealed plastic from the rough-textured surface of the second sealing bar.

2. In a plastic-sealing machine comprising a sealing bar, means for heating the same, and conveyor means for moving adjoined plastic sheets to a position adjacent the sealing bar for sealing, a second sealing bar adapted to cooperate with said heated sealing bar in applying pressure to the plastic sheets during sealing, said second sealing bar having in contact with the plastic sheets a surface formed of high-temperature resistant material and having a rough texture providing minute recesses operative to receive and grip during and following the sealing operation the plastic being sealed, means for imparting to the sealing bars relative motion between sealing operations, a stripping bar mounted adjacent the second sealing bar and across the path of movement of the plastic sheets, means for moving said stripping bar following each sealing operation to disengage the sealed plastic from the rough-textured surface of the second sealing bar, and linkage coupling said last-mentioned means and the heated sealing bar operative automatically to move the stripping bar for a stripping operation in timed relationship with the relative movement of the two sealing bars following a sealing operation.

KENNETH F. SPALDING.

REFERENCES CITED

The following references are of record in the file of this patent:

UNITED STATES PATENTS

| Number | Name | Date |
| --- | --- | --- |
| 1,206,093 | Chapman | Nov. 28, 1916 |
| 1,647,379 | Swift | Nov. 1, 1927 |
| 2,278,643 | Braun | Apr. 7, 1942 |
| 2,301,771 | Billeb | Nov. 10, 1942 |
| 2,390,550 | Moore | Dec. 11, 1945 |
| 2,395,387 | Fry | Feb. 26, 1946 |
| 2,433,176 | Van Epps | Dec. 23, 1947 |
| 2,460,460 | Langer | Feb. 1, 1949 |
| 2,467,879 | Billeb | Apr. 19, 1949 |